United States Patent
Kang et al.

(10) Patent No.: US 9,889,433 B2
(45) Date of Patent: Feb. 13, 2018

(54) METHOD FOR MANUFACTURING HOMOGENEOUS SUPPORTED CATALYST FOR CARBON NANOTUBES

(71) Applicant: LG CHEM, LTD., Seoul (KR)

(72) Inventors: Kyung Yeon Kang, Daejeon (KR); Jin Do Kim, Daejeon (KR); Sung Jin Kim, Daejeon (KR); Jae Keun Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/357,141

(22) PCT Filed: Jan. 9, 2013

(86) PCT No.: PCT/KR2013/000158
§ 371 (c)(1),
(2) Date: May 8, 2014

(87) PCT Pub. No.: WO2013/105780
PCT Pub. Date: Jul. 18, 2013

(65) Prior Publication Data
US 2014/0309105 A1    Oct. 16, 2014

(30) Foreign Application Priority Data

Jan. 11, 2012  (KR) .................. 10-2012-0003428
Jan. 4, 2013   (KR) .................. 10-2013-0001079

(51) Int. Cl.
*B01J 23/00*     (2006.01)
*B01J 23/881*    (2006.01)
(Continued)

(52) U.S. Cl.
CPC ............ *B01J 23/881* (2013.01); *B01J 23/88* (2013.01); *B01J 31/1616* (2013.01);
(Continued)

(58) Field of Classification Search
CPC ...................................................... B01J 23/881
(Continued)

(56) References Cited

U.S. PATENT DOCUMENTS 5,707,916 A    1/1998   Snyder et al.
6,239,066 B1   5/2001   Shukis et al.
(Continued)

FOREIGN PATENT DOCUMENTS

EP    2 746 221 A1    6/2014
EP    2 803 638 A1    11/2014
(Continued)

OTHER PUBLICATIONS

Prashant Dubey, Sang Kyu Choi, Ji Hoon Choi, Dong Hoon Shin, and Cheol Jin Lee, "High-Quality Thin-Multiwalled Carbon Nanotubes Synthesized by Fe—Mo/MgO Catalyst Based on a Sol-Gel Technique: Synthesis, Characterization, and Field Emission", Jun. 2010, Journal of Nanoscience and Nanotechnology, vol. 10, No. 6, pp. 3998-4006.*

(Continued)

*Primary Examiner* — Haytham Soliman
(74) *Attorney, Agent, or Firm* — Dentons US LLP

(57) ABSTRACT

Disclosed is a method for manufacturing a homogeneous supported catalyst for carbon nanotubes. Advantageously, the method induces deep impregnation of a catalyst in micro pores of a support by using high-temperature aging impregnation, thus providing a high CNT yield.

6 Claims, 2 Drawing Sheets

(51) Int. Cl.

| | | |
|---|---|---|
| *B82Y 30/00* | (2011.01) | |
| *B82Y 40/00* | (2011.01) | |
| *B01J 31/16* | (2006.01) | |
| *B01J 31/22* | (2006.01) | |
| *B01J 37/08* | (2006.01) | |
| *B01J 37/10* | (2006.01) | |
| *B01J 23/88* | (2006.01) | |
| *B01J 37/02* | (2006.01) | |
| *C01B 32/162* | (2017.01) | |
| *B01J 35/02* | (2006.01) | |
| *B01J 35/10* | (2006.01) | |

(52) U.S. Cl.
CPC ....... *B01J 31/2239* (2013.01); *B01J 37/0203* (2013.01); *B01J 37/08* (2013.01); *B01J 37/10* (2013.01); *B82Y 30/00* (2013.01); *B82Y 40/00* (2013.01); *C01B 32/162* (2017.08); *B01J 35/023* (2013.01); *B01J 35/1019* (2013.01); *B01J 35/1042* (2013.01); *B01J 37/0236* (2013.01); *B01J 2531/64* (2013.01); *B01J 2531/842* (2013.01)

(58) Field of Classification Search
USPC .......................................... 502/321
See application file for complete search history.

(56) References Cited

U.S. PATENT DOCUMENTS

| | | | |
|---|---|---|---|
| 2001/0014307 A1 | 8/2001 | Moy et al. | |
| 2008/0017551 A1 | 1/2008 | Kiriyama et al. | |
| 2012/0149551 A1* | 6/2012 | Gaillard | B01J 23/85 502/74 |
| 2015/0017527 A1 | 1/2015 | Lee et al. | |

FOREIGN PATENT DOCUMENTS

| | | | |
|---|---|---|---|
| KR | 10-2008-0000033 | 1/2008 | |
| KR | 10-2010-00067048 | 6/2010 | |
| KR | 10-1007183 | 1/2011 | |
| KR | 10-2013-0081916 A | 7/2013 | |
| KR | 10-2013-0081921 A | 7/2013 | |
| KR | 2013-0082267 A | 7/2013 | |
| WO | WO 2011020971 A2 * | 2/2011 | ............ B01J 23/85 |

OTHER PUBLICATIONS

W.L. Wang, X.D. Bai, Zhi Xu, S. Liu, E.G. Wang "Low temperature growth of single-walled carbon nanotubes: Small diameters with narrow distribution" Dec. 1, 2005, Chemical Physics Letters 419 (2006) 81-85.*

Liu et al. "New technique of synthesizing single-walled carbon nanotubes from ethanol using fluidized-bed over Fe—Mo/MgO catalyst" Spectrochimica Acta Part A: Molecular and Biomolecular Spectroscopy vol. 64, Issue 2, May 15, 2006, pp. 296-300.*

Halesowen College, Heating under reflux, Apr. 25, 2005 https://web.archive.org/web/20050425045307/http://www.halesowen.ac.uk/chemistry/heating__under__reflux.htm.*

Cassell et al. "Large Scale CVD Synthesis of Single-Walled Carbon Nanotubes" J. Phys. Chem. B, 103 (31), pp. 6484-6492, Jul. 20, 1999.*

Machine translation of KR20130082267, Metal Aqueous Solution, Supported Catalyst for CNT, and a Method for Preparing Thereof, Jul. 19, 2013 (Year: 2013).*

"New Technique of Synthesizing Single-Walled Carbon Nanotubes from Ethanol Using Fluidized-bed over Fe—Mo/MgO Catalyst"; Liu, et al.; Spectrochimica Acta Part A 64 (2006) 296-300.

"The Effect of Calcination Temperature on Metallic Particle Size in Fe—Mo—MgO Catalyst" Jeong, et al.; Theories and Applications of Chem, Eng., 2007, vol. 13, No. 2.

Yunfang Liu et al., "Combined catalyst system for preferential growth of few-walled carbon nanotubes", Carbon 47, Elsevier, Oxford, GB, vol. 47, No. 10, May 18, 2009, pp. 2543-2546, XP026195468A.

* cited by examiner

METHOD FOR MANUFACTURING HOMOGENEOUS SUPPORTED CATALYST FOR CARBON NANOTUBES

This application is a National Stage Entry of International Application No. PCT/KR2013/000158, filed Jan. 9, 2013, and claims the benefit of Korean Application No. 10-2012-0003428, filed on Jan. 11, 2012, and Korean Application No. 10-2013-0001079, filed on Jan. 4, 2013, all of which are hereby incorporated by reference in their entirety for all purposes as if fully set forth herein.

TECHNICAL FIELD

The present invention relates to a method for manufacturing a homogeneous supported catalyst for carbon nanotubes.

BACKGROUND ART

Carbon nanotubes (hereinafter, referred as to "CNTs") are understood to mean cylindrical carbon nanotubes having a diameter of 3 to 150 nm, preferably 3 to 100 nm, and a length of many times, i.e. at least 100 times the diameter. CNTs consist of aligned carbon atom layers and have different types of cores. CNTs are also called as carbon fibrils or hollow carbon fibers. CNTs are industrially essential in the production of composites because of the size and specific properties thereof and may be utilized in further applications including electrical applications and energy applications.

CNTs are generally manufactured by arc discharge, laser ablation, chemical vapor deposition or the like. However, arc discharge and laser ablation are disadvantageously not suited to mass-production and involve excessive preparation costs or laser purchase costs.

Furthermore, chemical vapor deposition has problems in that synthesis velocity is very low and synthesized CNT particles are extremely small in the case of using a gas-phase dispersion catalyst and has a limit to bulk production of CNTs because space utilization inside a reactor is significantly reduced in the case of using a substrate-supported catalyst.

The catalytically active component of the catalyst generally has an oxide form, a partially or completely reduced form, or a hydroxide form and the catalyst may be a supported catalyst, a co-precipitation catalyst or the like which is commonly used for the production of CNTs. Of these, the supported catalyst is preferred because the carbon nanotube catalyst advantageously has a higher bulk density than a co-precipitation catalyst, reduces probability of generation of fine powder by attrition which may be generated during fluidization due to small-amount generation of fine powder of 10 microns or less unlike the co-precipitation catalyst, and enables stable operation of the reactor due to superior mechanical strength of the catalyst.

In addition, as a method for producing a supported catalyst, an impregnation method including mixing an aqueous metal solution and a support, followed by coating and drying is suggested. When a catalyst is produced using a rotary evaporator or the like at room temperature to a medium to low temperature of about 60° C., CNT yield and amount of supported metal can be increased, but a problem such as deterioration in activity based on amount of the supported metal is generated due to high viscosity of the homogeneous metal solution.

Accordingly, there is a need for research on methods for manufacturing supported catalysts capable of solving this problem.

DISCLOSURE

Technical Problem

Therefore, the present invention has been made in view of the above problems, and it is an object of the present invention to provide a method for manufacturing a homogeneous supported catalyst for carbon nanotubes which improves impregnation efficiency of a supported metal in micropores and enhances stability of the impregnated metal during drying and baking.

Technical Solution

In accordance with one aspect of the present invention, the above and other objects can be accomplished by the provision of a method for manufacturing a homogeneous supported catalyst for carbon nanotubes comprising mixing an aqueous precursor solution of an active component (A) with a precipitation-inhibiting component (M), and then mixing the resulting mixture with an aqueous precursor solution of a catalyst component to obtain a homogeneous aqueous metal solution, mixing the homogeneous aqueous metal solution with a support and aging-impregnating the resulting mixture at a temperature of higher than 20° C. and not higher than 100° C. for a time of longer than 30 minutes and not longer than 15 hours to obtain a mixture, and vacuum drying the mixture to prepare a supported catalyst.

Hereinafter, the present invention will be described in detail.

The method for manufacturing a homogeneous supported catalyst for carbon nanotubes is characterized in that high-temperature aging is used for an impregnation process in consideration of impregnation of supported catalyst in micropores, in an attempt to solve problems including formation of solid clusters during drying of metal catalyst for manufacturing CNTs, difficulty of complete removal of a solvent (water), deterioration in yield of the final catalyst and deterioration in activity during baking.

For reference, in accordance with an impregnation catalyst support method using oven drying used for production of conventional metal catalysts for manufacturing CNTs, a fine powder having a smaller diameter than the support is formed by precipitation between a metal component and an active component at 100° C. or higher. For example, when Fe is used as the metal component and Mo is used as the active component, a dark yellow precipitate is formed by reaction represented by $Fe^{3+}+3MoO^{-} \rightarrow Fe(MoO)_3 \downarrow$, thus making it impossible to produce a clear homogeneous supported catalyst.

On the other hand, the catalyst suggested by the present invention corresponds to a homogeneous catalyst because it is suitable for use in a fluidized bed reactor (FBR) for manufacturing carbon nanotubes and prevents the precipitation through rapid drying.

First, a precipitation-inhibiting component and an aqueous precursor solution of a catalyst component are sequentially mixed with an aqueous precursor solution of an active component to obtain a clear homogeneous aqueous metal solution (first step). The obtained homogeneous aqueous metal solution is mixed with a support and is impregnated in the support by aging at a high temperature to obtain the mixture (second step). Then, the obtained mixture was vacuum-dried to produce a supported catalyst in which the support is surface-coated with the catalyst (third step).

The catalyst component used for the present invention may comprise at least one selected from Fe, Co and Ni, may for example, comprise at least one selected from Fe salts, Fe oxides, Fe compounds, Co salts, Co oxides, Co compounds, Ni salts, Ni oxides and Ni compounds and may be, for example, nitride such as $Fe(NO_3)_2.6H_2O$, $Fe(NO_3)_2.9H_2O$, $Ni(NO_3)_2.6H_2O$ or $Co(NO_3)_2.6H_2O$.

In addition, the active component used for the present invention is for example Mo, is for example a Mo salt, Mo oxide or a Mo compound and is for example nitride, such as $(NH_4)_6Mo_7O_{24}.4H_2O$, which may be dissolved in distilled water before use.

Furthermore, the precipitation-inhibiting component is for example multicarboxylic acid and in another example comprises at least one selected from the group consisting of dicarboxylic acid, tricarboxylic acid and tetracarboxylic acid.

More specifically, the first step using these components comprises preparing an aqueous Mo precursor solution (process a), mixing the aqueous Mo precursor solution with a precipitation-inhibiting component (process b) and mixing the aqueous solution of the Mo precursor and the precipitation-inhibiting component with a catalyst component precursor (process c).

The Mo precursor used for the process a of the first step may be a solution of Mo nitride or the like in distilled water, but the present invention is not limited thereto. The aqueous Mo precursor solution is preferably present in an amount of 0.5 to 12% by mol based on the active component in view of reaction efficiency.

At least one selected from dicarboxylic acid, tricarboxylic acid and tetracarboxylic acid, as the precipitation-inhibiting component (M) used for the process b of the first step, is preferably added in an amount to adjust a molar ratio (M/A) of the precipitation-inhibiting component (M) to the Mo precursor (A) to 0.2 to 0.5, when taking into consideration improvement in CNT yield due to prevention of precipitation of the aqueous solution and production of homogeneous catalyst.

Then, the catalyst component precursor used for the process c in the first step may comprise at least one selected from Fe, Co and Ni and is specifically a solution of at least one of nitrides thereof in distilled water. Specifically, the catalyst component may be present in an amount of 10 to 40% by mol based on the catalyst component in view of reaction efficiency.

A concentration of the homogeneous aqueous metal solution thus obtained is preferably 0.1 to 0.4 g/ml, or 0.1 to 0.3 g/ml in terms of reactivity.

The support is mixed with the homogeneous aqueous metal solution obtained through the first step (second step). The support used for the second step may be selected from alumina, magnesium oxide and silica and is preferably alumina, as demonstrated in the following Example. In another example, the support may be a commonly used support such as $Al_2O_3$, MgO or $SiO_2$.

The aging-impregnation is preferably carried out at a temperature of higher than 20° C. and not higher than 100° C., or 60 to 100° C. for a time of longer than 30 minutes and not longer than 15 hours, or 1 to 15 hours, as demonstrated in the following Example, because high-temperature aging improves mobility of a metal salt in the homogeneous aqueous metal solution to move the metal salt to deep micropores of the alumina and thereby provides high support efficiency.

The mixture obtained after the aging is subjected to rapid drying. The rapid drying is performed under vacuum at for example 45 to 80° C. within one hour or for one minute to one hour, as demonstrated in the following Example, because an excess metal salt which remains un-impregnated in deep micropores of the alumina can be homogeneously impregnated in the alumina and coated on the surface of the alumina by drying.

The meaning of "vacuum" in the vacuum drying used herein is particularly not limited so long as it has a vacuum range commonly used for vacuum drying.

Next, the baking is preferably carried out at 650 to 800° C. for 30 minutes to 5 hours. The particulate supported catalyst has a spherical shape with a particle diameter or an average particle diameter of 30 to 200 μm and a surface particle diameter observed by SEM of 10 to 100 nm, but the particle diameter depends on particle diameter of used support and is thus not limited to the range defined above.

Hereinafter, an apparatus for manufacturing the homogeneous supported catalyst will be described in detail.

Specifically, the apparatus includes a device for preparing a homogeneous aqueous metal solution, a device for mixing the homogeneous aqueous metal solution and the support transferred from the preparation device, a device for impregnating the resulting product by aging at a high temperature and a device for drying the aged impregnation product transferred from the impregnation device.

The homogeneous aqueous metal solution preparation device may be a solution stirring-mixer which includes a catalyst component feeder, an active component feeder, a precipitation-inhibiting component feeder and a controller for controlling the three feeders.

The controller may sequentially perform control operations in a such manner that the catalyst component feeder and the precipitation-inhibiting component feeder are turned off and the active component feeder is turned on to complete feeding of the precursor of the active component, and the catalyst component feeder and the active component feeder are turned off and the precipitation-inhibiting component feeder is turned on to complete feeding of the precipitation-inhibiting component, and the active component feeder and the precipitation-inhibiting component feeder are turned off and the catalyst component feeder is turned on to complete of feeding of the precursor of the catalyst component.

The homogeneous aqueous metal solution and the support transferred from the homogeneous aqueous metal solution preparation device are mixed in a stirring mixer or the like as the mixing device, the resulting mixture is impregnated by aging at a high temperature using the impregnation device, the aged and impregnated product transferred from the impregnation device is dried in the drying device, and the product is baked in the baking device to provide homogeneous impregnation and coating of the particulate catalyst component on the support surface. The drying device may be a vacuum drier, preferably, rotary heater.

The vacuum drier may have a straight wall surface therein, may have a baffle, or may rotate at a predetermined rate while having an inclination with respect to a vertical axis.

In addition, the aging is performed at 60 to 100° C. for 1 to 15 hours using, as the aging-impregnation device, a reflux enabling reflux of the solvent by over-heating for aging prior to transfer to the drying device.

The present invention provides a method for manufacturing a homogeneous supported catalyst for carbon nanotubes and an apparatus used therefor which improve an efficiency of impregnation of a supported metal in micropores and enhance stability of the impregnated metal during drying and baking.

Effects of the Invention

As apparent from the fore-going, a method for manufacturing a homogeneous supported catalyst for carbon nanotubes and an apparatus used therefor induce deep impregnation of a catalyst metal in micropores of a support by using high-temperature aging impregnation and thereby provide a catalyst having a high CNT yield due to high support efficiency.

DESCRIPTION OF DRAWINGS

The above and other objects, features and advantages of the present invention will become apparent from the following description of preferred embodiments given in conjunction with the accompanying drawings, in which.

BEST MODE

Now, preferred examples will be provided for better understanding of the present invention. These examples are only provided to illustrate the present invention and should not be construed as limiting the scope and spirit of the present invention.

EXAMPLE

Example 1

Production 1 of CNT Catalyst 0.109 g [0.57 mmol] of citric acid was added to a flask A containing a solution of 0.276 g of $(NH_4)_6Mo_7O_{24} \cdot 4H_2O$ [0.223 mmol, Mo: 1.53 mmol] in 15 ml of water (citric acid/Mo molar ratio=0.36), and 3.98 g [9.85 mmol] of $Fe(NO_3)_2 \cdot 9H_2O$ was added thereto to prepare an aqueous metal solution.

The aqueous metal solution had a concentration of 0.3 g/ml and was obtained as a precipitate-free clear solution.

Then, a catalytically active metal precursor was sufficiently supported on $Al_2O_3$ by adding the solution of the flask A to a flask B containing 2.5 g of $Al_2O_3$ (D50v=80 micron, D50n=55 micron, pore volume: 0.64 cm³/g, surface area: 237 m²/g, product produced by Saint Gobain), followed by aging while stirring in a thermostat reactor including a 95° C. reflux bath for 12 hours.

The obtained sample was vacuum-dried by rotary evaporation and baked at 700° C. for 3 hours to produce a homogeneous supported catalyst.

Figure 1:
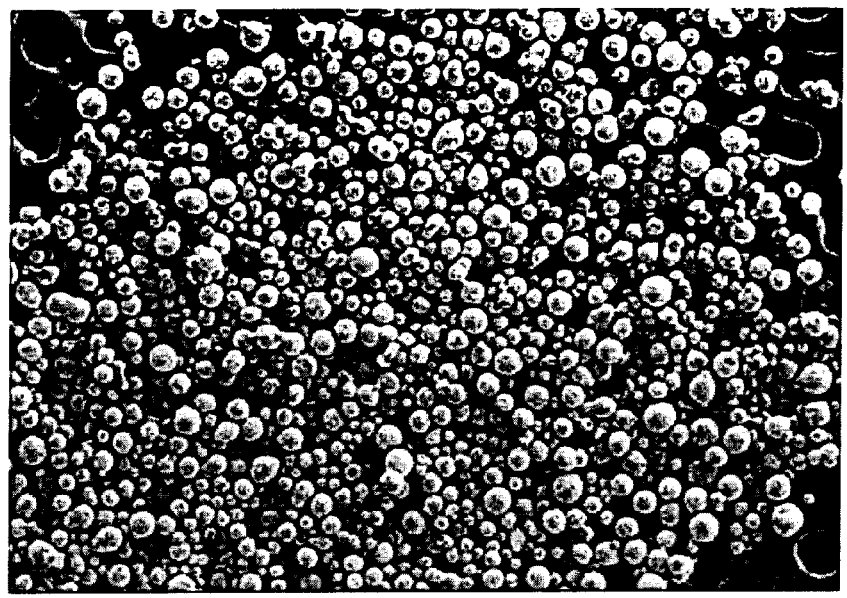
FIG. 1 is an SEM image (×35) showing a particulate catalyst produced according to Example 1 of the present invention.

As can be seen from FIG. 1, the produced catalyst formed particles during drying and a yield of the finally obtained catalyst was 95% when an amount of the obtained catalyst was calculated based on amounts of the metal solution and alumina used for the production.

Example 2

Production 2 of CNT Catalyst

The same process as in Example 1 was repeated, except that aging was performed at 70° C. for 6 hours and drying was further performed twice by rotary evaporation at 60° C. for 30 minutes.

The produced catalyst also formed particles during drying and a yield of the finally obtained catalyst was 93% when an amount of the obtained catalyst was calculated based on amounts of the metal solution and alumina used for the production.

Comparative Example 1

Production 3 of CNT Catalyst

The same process as in Example 1 was repeated, except that aging was performed at 20° C. for 15 minutes and drying was further performed twice by rotary evaporation at 60° C. for 30 minutes. The produced catalyst also formed particles during drying and a yield of the finally obtained catalyst was 92% when an amount of the obtained catalyst was calculated based on amounts of the metal solution and alumina used for the production.

Comparative Example 2

Production 4 of CNT Catalyst

Figure 2:
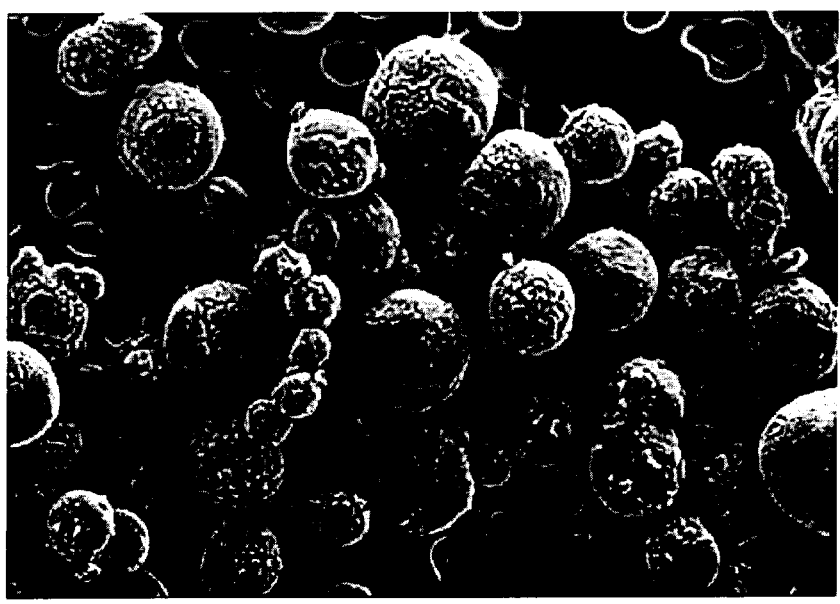
FIG. 2 is an SEM image (×100) showing CNTs synthesized using the catalyst of Example 1 according to the present invention.
Figure 3:
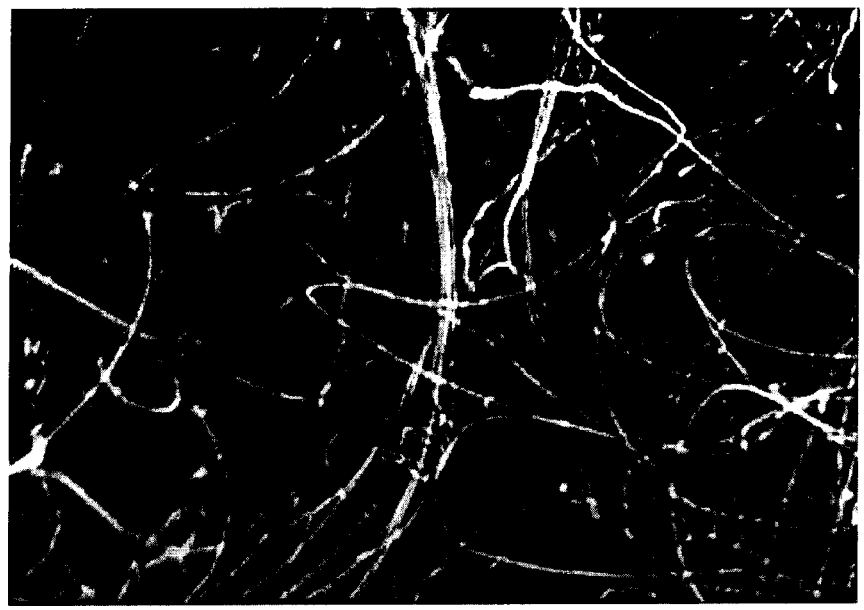
FIG. 3 is a high-magnification SEM image (×50,000) showing CNTs synthesized using the catalyst of Example 1 according to the present invention.

The same process as in Example 1 was repeated, except that aging was performed for 30 minutes and drying was further performed twice by rotary evaporation at 60° C. for 30 minutes. As can be seen from FIG. 2, the produced catalyst formed clusters during drying and a yield of the finally obtained catalyst was 90% when an amount of the obtained catalyst was calculated based on amounts of the metal solution and alumina used for the production.

CNT Production Example

Carbon nanotube synthesis was tested in a laboratory scale fixed bed reactor using catalysts for synthesizing CNTs produced in Examples 1 to 2.

Specifically, the catalyst for synthesizing CNTs produced in Example 1 was mounted in the middle of a quartz tube having an inner diameter of 55 mm, heated under a nitrogen atmosphere to 700° C. and allowed to stand, and nitrogen, hydrogen and an ethylene gas were flowed at a predetermined volume mix ratio such that a total flow rate was set to 180 ml per minute, and a predetermined amount of carbon nanotubes were synthesized for one hour.

The synthesized carbon nanotubes were obtained at room temperature and content thereof was measured. Reaction yield was calculated in accordance with the following equation based on weight of used catalyst for synthesizing CNTs and increment of weight of the catalyst after reaction.

CNT yield (g CNT/g Cat)=[total weight after reaction (g)−weight of used catalyst (g)]/weight of used catalyst (g)×100

CNTs collected in a CNT collector after reaction for one hour in Example 1 exhibited a CNT yield of 28.6 g CNT/g Cat with respect to amount of added catalyst and had a particle diameter or an average particle diameter of 20 to 30 nm. Results of Example 2 are summarized in the following Table 1.

CNT Production Comparative Example

CNT synthesis test was performed in the same manner as in Example 1, except that catalysts of Comparative Examples 1 to 2 were used, instead of the catalyst of Example 1.

CNTs collected in a CNT collector after reaction for one hour in Comparative Example 1 exhibited a yield of 15.3 g CNT/g Cat with respect to amount of added catalyst and a particle diameter or an average particle diameter of obtained CNTs was 20 to 30 nm. Results of Comparative Example 2 are also summarized in the following Table 1.

TABLE 1

| Items | Example 1 | Example 2 | Comparative Example 1 | Comparative Example 2 |
|---|---|---|---|---|
| Catalyst Aging | 95° C., 12 hr | 70° C., 6 hr | 20° C., 15 min | 95° C., 30 min |
| Drying | | ○ (rotary evaporation) | | |
| Particle shape of catalyst | Particulate | Particulate | Particulate | Particulate |
| Final catalyst yield (wt %) | 95 | 95 | 92 | 90 |
| CNT yield (gCNT/gCat) | 28.6 | 24.5 | 15.3 | 17.4 |

As can be seen from Table 1, all of Examples 1 and 2, and Comparative Examples 1 and 2 wherein catalysts were produced without aging-impregnation obtained particulate catalysts, but Comparative Examples 1 and 2 exhibited a low CNT yield due to low impregnation efficiency of supported metal in micropores of alumina.

What is claimed is:

1. A method for manufacturing a homogeneous supported catalyst for carbon nanotubes comprising steps of:

preparing an aqueous precursor solution comprising an active component, the active component comprising Mo;

mixing the aqueous precursor solution with a precipitation-inhibiting component to produce a mixture;

then mixing the mixture with a catalyst component comprising Fe to obtain a homogeneous aqueous metal solution;

mixing the homogeneous aqueous metal solution with a solid support having micropores and aging-impregnating the homogeneous aqueous metal solution at a temperature of 60° C. to 100° C. for 1 to 15 hours to obtain an impregnated support by using a thermostat reactor, wherein in the impregnated support, the homogeneous aqueous metal solution is impregnated in the micropores of the solid support;

vacuum drying the mixture to prepare a supported catalyst at 45 to 80° C. for 1 minute to 1 hour, and wherein the solid support having micropores comprises at least one compound selected from the group consisting of alumina and silica, wherein the precipitation-inhibiting component and the active component are added such that a molar ratio of the precipitation-inhibiting component to the active component is adjusted to 0.2 to 0.5.

2. The method according to claim 1, wherein the precipitation-inhibiting component comprises multicarboxylic acid.

3. The method according to claim 2, wherein the multicarboxylic acid comprises at least one selected from dicarboxylic acid, tricarboxylic acid and tetracarboxylic acid.

4. The method according to claim 1, wherein the homogeneous aqueous metal solution has a concentration of 0.1 to 0.4 g/ml.

5. The method according to claim 1, wherein the vacuum drying comprises rapid vacuum drying performed at 45 to 80° C. within one hour using a rotary vacuum drier.

6. The method according to claim 1, wherein the catalyst component comprises $Fe(NO_3)_2 \cdot 9H_2O$.

* * * * *